United States Patent

Inoue

[11] Patent Number: 6,129,644
[45] Date of Patent: Oct. 10, 2000

[54] TENSIONER GUIDE FOR CHAIN DRIVE UNIT

[75] Inventor: Kozo Inoue, Saitama-ken, Japan

[73] Assignee: Tsubakimoto Chain Co., Osaka, Japan

[21] Appl. No.: 09/167,941

[22] Filed: Oct. 6, 1998

[51] Int. Cl.[7] .................................................. F16H 7/08
[52] U.S. Cl. ..................... 474/110; 474/101; 474/111; 474/138
[58] Field of Search ............................ 474/101, 109–117, 474/133, 135–138, 84–86, 900, 150, 157, 148, 164, 212

[56] References Cited

U.S. PATENT DOCUMENTS

| | | | |
|---|---|---|---|
| 4,881,927 | 11/1989 | Suzuki | 474/110 |
| 5,120,278 | 6/1992 | Trzmiel | 474/136 |
| 5,197,420 | 3/1993 | Arnold et al. | 474/110 X |
| 5,246,404 | 9/1993 | Ojima | 474/111 |
| 5,248,282 | 9/1993 | Suzuki | 474/110 |
| 5,597,367 | 1/1997 | Trzmiel et al. | 474/110 |
| 5,776,024 | 7/1998 | White et al. | 474/110 |
| 5,782,625 | 7/1998 | Young | 474/110 |
| 5,846,149 | 12/1998 | Ledvina et al. | 474/86 X |

FOREIGN PATENT DOCUMENTS

| | | |
|---|---|---|
| 0106325 | 4/1984 | European Pat. Off. . |
| 1513722 | 6/1978 | United Kingdom . |

*Primary Examiner*—David A. Bucci
*Assistant Examiner*—Marcus Charles
*Attorney, Agent, or Firm*—Dann, Dorfman, Herrell and Skillman; Henry H. Skillman

[57] ABSTRACT

A tensioner guide includes a stationary shoe (6) having a contact surface (6A) confronting a free span of a transmission chain (4) between a pair of sprockets (2, 3), a movable shoe (7) movable relatively to the stationary shoe (6) in a direction toward and away from the transmission chain free span, and an urging member (9) for urging the movable shoe (7) toward the transmission chain free span. The movable shoe (7) has a contact surface (7A) being pressed against and in slide contact with the transmission chain free span by the action of the urging member (9) to hold a tension in the transmission chain (4). The movable shoe (7) is movable, in response to a decrease in the tension in the transmission chain (4), to project from the contact surface (6A) of the stationary shoe (6) to take out slack in the transmission chain (4) and, in response to an increase in the tension in the transmission chain (4), to retract into the contact surface (6A) of the stationary shoe (6) to such an extent that the contact surface (6A) of the stationary shoe (6) and the contact surface (7A) of the movable shoe (7) are both in sliding contact with the transmission chain free span.

9 Claims, 5 Drawing Sheets

TENSIONER GUIDE FOR CHAIN DRIVE UNIT

BACKGROUND OF THE INVENTION

1. Field of the Invention

The present invention relates generally to a tensioner guide used in a chain drive unit for applying a tension to a transmission chain to prevent the transmission chain from whipping or becoming slack while running, and more particularly to a tensioner guide suitable for use in an application where the tension side and slack side of a transmission chain are reversed or switched over during operation of the chain drive unit.

2. Description of the Related Art

In a chain drive unit having two sprockets disposed in spaced relation to form a drive side and a driven side of the chain drive unit, when the direction of rotation of the sprocket on the drive side is reversed or when the drive side and driven side of the chain drive unit are reversed, a tension run and a slack run of the transmission chain that are provided on opposite sides of the drive sprocket are reversed in position.

To deal with this problem, the chain drive unit may include, as shown here in FIG. 4, two stationary guides 30, 31 provided outside a loop of the transmission chain 32, with shoe surfaces 30a, 31a of the respective guides 30, 31 being in sliding contact with a tension run and a slack run of the transmission chain 32 to guide running of the transmission chain 32 over two spaced sprockets 33, 34.

The stationary guides 30, 31 provided on both of the tension and slack sides of the transmission chain 32 have a problem that when the chain 32 undergoes elongation due to a long period of use, vibration of the chain 32 while running is amplified and eventually causes the slack run of the chain 32 to beat or whip the shoe surface 31a of the confronting stationary guide 31. This operation generates unpleasant operation noises and accelerates wearing out of the shoe surface 31a.

Another conventional chain drive unit shown in FIG. 5 includes a stationary guide 35 disposed on one side of a transmission chain 36 trained over two sprockets 37, 38, with a shoe surface 35a being in sliding contact with a free run of the chain 36, and a pivotable guide 39 disposed on the other side of the chain 36 and pivotally supported on a fixed mounting shaft 40 with a shoe surface 39a being pressed against and in sliding contact with a free run of the chain 36 by means of a tensioner 41 acting on an oscillating free end of the pivotable guide 37 from the back side of the free end. With this arrangement, whenever the free run of the chain 36 which is in sliding contact with the stationary guide 35 forms a tension run of the chain 36, an elongation of the chain 36 caused due to aging, for example, can be taken up by pivotal movement of the pivotable guide 39 caused by the action of the tensioner 41. Thus, the chain 36 while running does not cause oscillation and slackening of the slack run.

However, when the chain free run being in sliding contact with the stationary guide 35 is arranged to form a slack run, the pivotable guide 39 is urged backwardly by a free run of the chain 36 being stretched or tensioned, and slack in the chain slack run is increased. The chain slack run with increased slack tends to beat the shoe surface 35a of the stationary guide 35, generating unpleasant operation noises and accelerating wearing-out of the shoe surface 35a, in the same manner as the prior art shown in FIG. 4.

SUMMARY OF THE INVENTION

With the foregoing drawbacks of the prior art in view, it is an object of the present invention to provide a tensioner guide for a chain drive unit, which is simple in construction, has a high degree of durability and can prevent whipping of a chain and generation of unpleasant operation noises over a long period of use even when a tension side and a slack side of the chain is switched over or reversed while the chain drive unit is in motion.

In one aspect the present invention provides a tensioner guide for use in a chain drive unit including an endless transmission chain trained over a pair of sprockets, the tensioner guide comprising: a stationary shoe having a contact surface confronting a free span of the transmission chain between the sprockets; a movable shoe movable relatively to the stationary shoe in a direction toward and away from the transmission chain free span; and an urging member for urging the movable shoe toward the transmission chain free span. The movable shoe has a contact surface being pressed against and in slide contact with the transmission chain free span by the action of the urging member to hold a tension in the transmission chain. The movable shoe is movable, in response to a decrease in the tension in the transmission chain, to project from the contact surface of the stationary shoe to take out slack in the transmission chain and, in response to an increase in the tension in the transmission chain, to retract into the contact surface of the stationary shoe to such an extent that the contact surface of the stationary shoe and the contact surface of the movable shoe are in sliding contact with the transmission chain free span.

The stationary shoe preferably has first and second shoe portions spaced in a direction of movement of the transmission chain, and the movable shoe is disposed between the first and second shoe portions of the stationary shoe.

In one preferred form of the invention, the tensioner guide further includes a guide housing disposed adjacent to the free span of the transmission chain and having a plunger hole extending perpendicularly to a line extending between axes of rotation of the sprockets, and a plunger slidably received in the plunger hole. The stationary shoe is attached to the guide housing, the movable shoe is firmly connected to one end of the plunger, and the urging member is disposed in the plunger hole and acts between the opposite end of the plunger and the guide housing.

Preferably, the plunger is generally cup-shaped and has an internal hollow portion. The guide housing further has a high-pressure chamber defined jointly by the hollow portion of the plunger and the plunger hole for receiving therein an oil, and a check valve for allowing passage therethough of the oil in one direction from an external oil supply source to the high-pressure chamber while blocking passage of the oil in the opposite direction. A pressure rise developed in the high-pressure chamber due to movement of the plunger urges the oil to leak from the high-pressure chamber to the outside of the guide housing through a clearance defined between an outside peripheral surfaces of the plunger and an inside peripheral surface of the plunger hole.

One of the sprockets is a drive sprocket and the transmission chain has a tension run on one side of the drive sprocket and a slack run on the other side of the drive sprocket. The stationary shoe, the movable shoe and the urging member are disposed adjacent each of the tension run and the slack run of the transmission chain.

In another aspect the present invention provides a tensioner guide for use in a chain drive unit including an endless transmission chain trained over a drive sprocket and a driven sprocket to provide a tension run on one side of the drive sprocket and a slack run on the opposite side of the drive sprocket, the tensioner guide comprising: a guide housing disposed between the tension run and the slack run of the transmission chain and having a plunger hole extending through the guide housing in a direction perpendicular to a line extending between axes of rotation of the drive and driven sprockets; a pair of stationary shoes attached to opposite surfaces of the guide housing and having a pair of contact surfaces, respectively, confronting the tension run and the slack run of the transmission chain; a pair of generally cup-shaped plungers slidably received in the plunger hole with respective open ends confronting each other, the plungers each having an internal hollow portion; an urging member disposed in the plunger hole and acting between the plungers to urge them in a direction away from each other; and a pair of movable shoes firmly connected to respective closed end of the cup-shaped plungers and movable to project from and retract into the contact surfaces of the stationary shoes by and against the action of the urging member so as to be pressed against and in sliding contact with the tension run and slack run of the transmission chain. The guide housing further has a high-pressure chamber defined jointly by the plunger hole and the hollow portions of the plungers for receiving therein an oil, an oil inlet opening to a central portion of the plunger hole for introducing the oil into the high-pressure chamber, and a check valve assembled in the oil inlet for allowing passage therethrough of the oil in one direction from an external oil supply source to the high-pressure chamber while blocking passage of the oil in the opposite direction. A pressure rise developed in the high-pressure chamber due to movement of at least one of the plungers urges the oil to leak from the high-pressure chamber to the outside of the guide housing through a clearance defined between respective outside peripheral surfaces of the plungers and an inside peripheral surface of the plunger hole.

The above and other features and advantages of the present invention will become manifest to these versed in the art upon making reference to the detailed description and the accompanying sheets of drawings in which preferred structural embodiments incorporating the principles of the invention are shown by way of illustrative examples.

DETAILED DESCRIPTION OF THE PREFERRED EMBODIMENTS

Certain preferred embodiments of the present invention will be described in greater detail with reference to the accompanying drawings.

Figure 1:
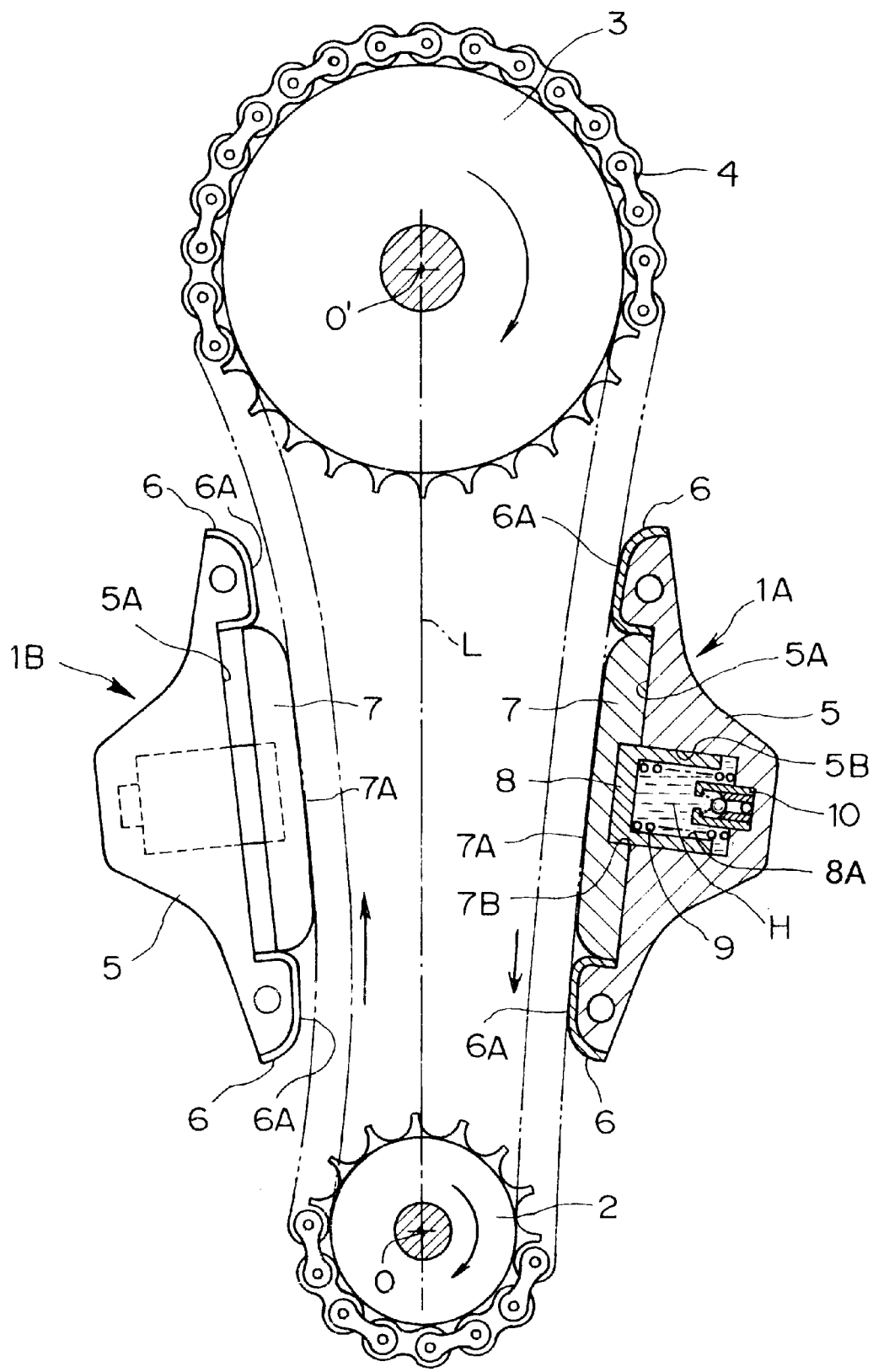
FIG. 1 is a front elevational view, with parts in cross section, of a chain drive unit equipped with a tensioner guide according to a first embodiment of the present invention.

Referring now to FIG. 1, there is shown a chain drive unit incorporating therein two tensioner guides 1A, 1B according to a first embodiment of the present invention. The chain drive unit also includes a drive sprocket 2, a driven sprocket 3 and an endless transmission chain 4 trained over the drive and drive sprockets 2, 3. The tensioner guides 1A, 1B are used in a pair and disposed in confrontation such that opposed free spans of the transmission chain 4 running between the drive and driven sprockets 2, 3 are disposed between the tensioner guides 1A, 1B.

The tensioner guides 1A, 1B are identical in construction and have a configuration symmetric with respect to a central axis extending substantially perpendicularly (left to right in FIG. 1) to each free span of the transmission chain 4. The tensioner guides 1A, 1B are disposed symmetrically with respect to an imaginary straight centerline L extending (top to bottom in FIG. 1) between an axis O of rotation of the drive sprocket 2 and an axis O' of rotation of the driven sprocket 3.

Each of the tensioner guides 1A, 1B includes a fixed guide housing 5, a pair of stationary shoes 6, 6 attached to opposite ends of the guide housing 5 which are spaced in a direction of running of the transmission chain 4, and a movable shoe 7 disposed between the stationary shoes 6, 6 and movable to project from and retract into contact surfaces 6A, 6A of the respective stationary shoes 6, 6.

The guide housing 5 has a recessed portion 5A opening toward the transmission chain 4 for movably receiving therein the movable shoe 7, and a plunger hole 5B located at a central portion of the recessed portion 5A.

The movable shoe 7 has a contact surface 7A provided for sliding contact with the transmission chain 4, and a plunger retaining recess or hole 7B formed in an inside surface opposite from the contact surface 7A. The plunger retaining hole 7B and the plunger hole 5B are aligned with each other.

A cup-shaped plunger 8 is open at one end and closed at the opposite end. The plunger 8 has a closed end portion firmly fitted in the plunger retaining hole 7B of the movable shoe 7. The remaining portion of the plunger 8 is slidably received in the plunger hole 5B of the guide housing 5. The cup-shaped plunger 8 has a cylindrical hollow portion 8A opening toward a bottom wall of the plunger hole 5B. The hollow portion 8A and the plunger hole 5B jointly form a high-pressure chamber H.

A compression coil spring 9 is disposed in the high-pressure chamber H and resiliently urges the plunger 8 and the movable shoe 7 in a direction to project from the contact surfaces 6A, 6A of the stationary shoes 6, 6 so that the respective free spans of the transmission chain 4 are urged inwardly toward the centerline L by the contact surfaces 7A, 7A of the movable shoes 7, 7.

A ball check valve 10 is assembled in the bottom wall of the plunger hole 5B. An oil supplied under pressure from an oil supply source (not shown) disposed outside the guide housing 5 flows through the ball check valve 10 into the high-pressure chamber H so that the high-pressure chamber H is always filled with the oil.

When the plunger 8 is displaced in a projecting direction (to project from the plunger hole 5B), the ball check valve 10 is open, allowing the oil to flow into the high-pressure chamber H. Conversely, when the plunger 8 is displaced in a retracting direction (to retract into the plunger hole 5B), the oil in the high-pressure chamber H is compressed and thereby increases the pressure in the high-pressure chamber H. As a consequence of this pressure rise in the high-pressure chamber H, the ball check valve 10 is closed and thereby prevents the oil from flowing from the high-pressure chamber H back toward the oil supply source.

With the chain drive unit of the foregoing construction, when the drive sprocket 2 is driven to rotate in the clockwise direction indicated by the arrow shown in FIG. 1, the transmission chain 4 trained around the drive and driven sprockets 2, 3 provides a tension run on one side (right-hand side in FIG. 1) of the drive sprocket 2 and a slack run on the other side (left-hand side in FIG. 1) of the drive sprocket 2. The tension run of the transmission chain 4 is pulled by the drive sprocket 2 and hence is stretched between the drive and driven sprockets 2, 3. The movable shoe 7 of the tensioner guide 1A which is in sliding contact with the tension run of the transmission chain 4 is therefore urged backward by the transmission chain tension run.

When the force of the transmission chain tension run tending to retract the movable shoe 17 exceeds the force of the compression coil spring 9 tending to project the movable shoe 7, the pressure of oil in the high-pressure chamber H increases.

In this instance, however, since the oil inside the high-pressure chamber H is prevented by the ball check valve 10 from flowing back toward the oil supply source, the pressure rise in the high-pressure chamber H forces the oil to leak from the high-pressure chamber H to the outside of the tensioner guide 1A through a clearance between an outside peripheral surface of the plunger 8 and an inside peripheral surface of the plunger hole 5B. As a result, the movable shoe 7 retracts into the recessed portion 5A of the guide housing 5 where the contact surface 7A of the movable shoe 7 lies substantially flash with the contact surfaces 6A, 6A of the stationary shoes 6, 6. Thus, the tension run of the transmission chain 4 now comes into sliding contact with the contact surfaces 6A, 6A of the stationary shoes 6, 6 during which time the transmission chain tension is held in sliding contact with the contact surface 7A of the movable shoe 7. Because a large contact area is provided between the transmission chain tension run and the stationary and movable shoes 6, 7 of the tensioner guide 1A, the tension run of the transmission chain 4 while running is stably supported.

The slack run (left-hand side in FIG. 1) of the transmission chain 4 is not stretched between the drive and driven sprockets 2, 3. Accordingly, the movable shoe 7 of the tensioner guide 1B projects from the contact surfaces 6A of the stationary shoes 6, 6 under the force of the compression coil spring 9 and thereby forces the slack run of the transmission chain 4 inwardly toward the tension run of the transmission chain 4 by means of the contact surface 7A. With this movement of the movable shoe 7, the slack run of the transmission chain 4 is held under tension by the tensioner guide 1B. By virtue of the tensioner guides 1A, 1B, the tension run and slack run of the transmission chain 4 are held under tension or otherwise kept free from slack and, hence, the transmission chain 4 can run over the drive and driven sprockets 2, 3 without producing undue vibrations or unpleasant operation noise.

When the drive sprocket 2 is rotated in a direction opposite to the direction of the arrow (namely, in the counterclockwise direction), the positional relation between the tension run and the slack run of the transmission chain 4 is reversed. In this instance, because the tensioner guides 1A, 1B are disposed symmetrically with respect to the straight centerline L interconnecting the axes O, O' of rotation of the drive and driven sprockets 2, 3, the movable shoe 7 of the tensioner guide 1B (on the left-hand side in FIG. 1) is forced to move into the recessed portion 5A of the guide housing 5 by means of a transmission chain tension run which is stretched between the drive and driven sprockets 2, 3. On the other hand, the movable shoe 7 of the tensioner guide 1A (on the right-hand side in FIG. 1) projects from the contact surfaces 6A, 6A of the stationary shoes 6 under the force of the compression coil spring 9 and thereby forces a transmission chain slack run inwardly toward the transmission chain tenson run. Thus, the transmission chain 4 while running over the drive and driven sprockets 2, 3 is stably held under proper tension by means of the tensioner guides 1A, 1B.

Since the high-pressure chamber H of each tensioner guide 1A, 1B is filled with an oil supplied from the non-illustrated external oil supply source via the ball check valve, an impact force or shock applied from the transmission chain 4 to the movable shoe 7 of each tension guide 1A, 1B in a direction to thrust the plunger 8 into the plunger hole 5B will compress the oil inside the high-pressure chamber H and hence increase the pressure of the high-pressure chamber H. Due to a pressure rise developed inside the high-pressure chamber H, the oil trapped inside the high-pressure chamber H is forced to leak from the high-pressure chamber H to the outside of the tensioner guide 1A, 1B through a slight clearance between an outside peripheral surface of the plunger 8 and an inside peripheral surface of the plunger hole 5. During that time, the oil encounters a flow resistance which acts to absorb the impact force applied from the transmission chain 4 to the tensioner guide 1A, 1B. The transmission chain 4 is, therefore, kept free from oscillation.

In the illustrated embodiment two identical tensioner guides 1a, 1B are in one pair and disposed adjacent two confronting free spans of the transmission chain 4 trained over the drive and driven sprockets 2, 3. The tensioner guides 1A, 1B may alternatively be used singly as a guide which is particularly suitable for used in an application where a tension in the transmission chain varies greatly.

Figure 2:
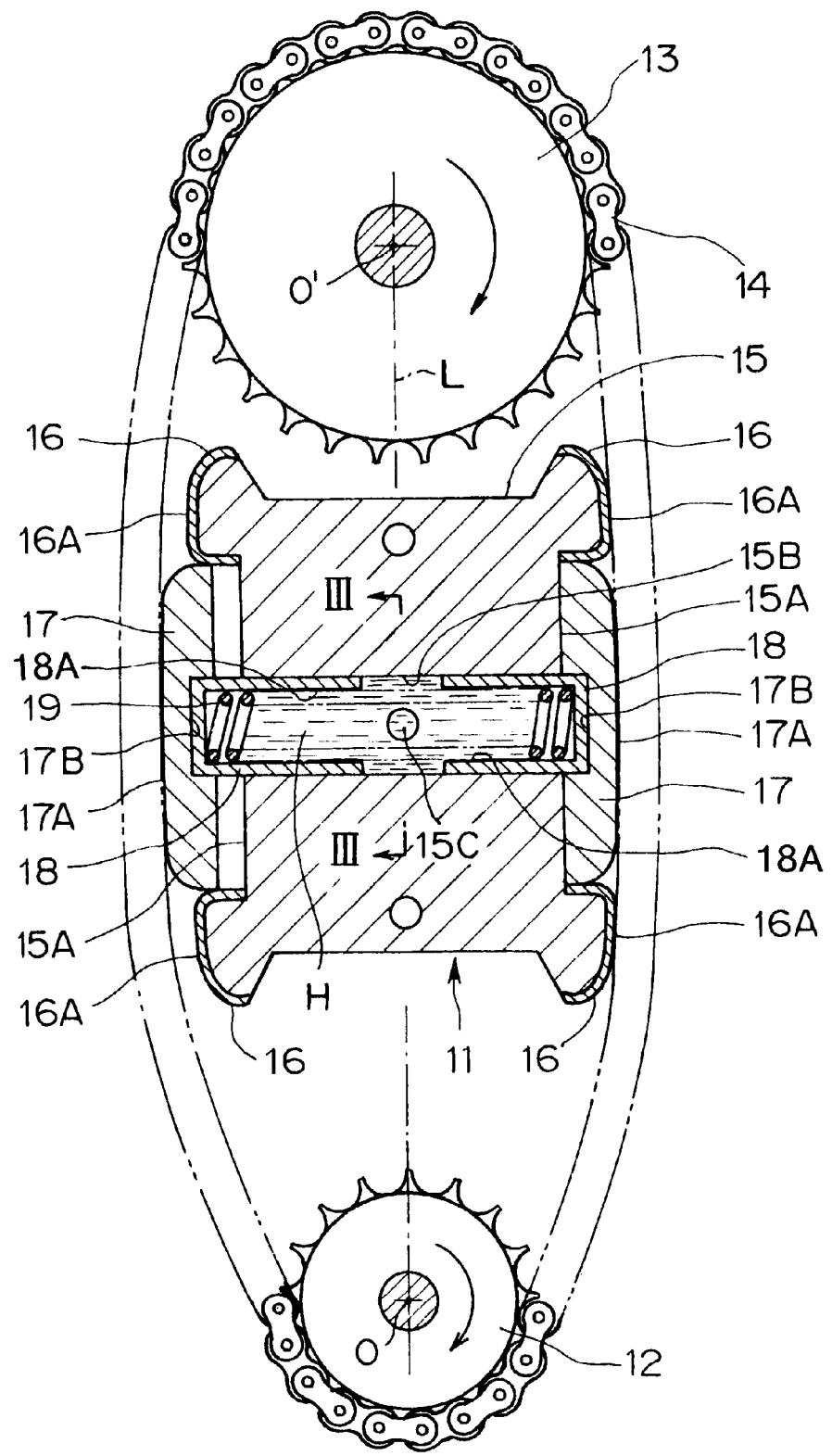
FIG. 2 is a view similar to FIG. 1, but showing a tensioner guide according to a second embodiment of the present invention.

FIG. 2 shows, in front elevation with parts in cross section, a chain drive unit including a tensioner guide 11 according to a second embodiment of the present invention. The tensioner guide 11 is disposed between two opposed free spans of a transmission chain 14 trained over and between a drive sprocket 12 and a driven sprocket 13.

The tensioner guide 11 has a configuration symmetric with respect to a central axis extending substantially perpendicularly (left to right in FIG. 2) to a straight centerline L extending (top to bottom in FIG. 2) between an axis O of rotation of the drive sprocket 12 and an axis O' of rotation of the driven sprocket 13. The tensioner guide 11 includes a block-like guide housing 15. The guide housing 15 has a shape which is symmetric with respect to the straight centerline L.

The guide housing 15 is fixed in position and has on each of its right and left sides a pair of stationary shoes 16, 16 spaced in a direction of running of the transmission chain 14. A movable shoe 17 is disposed between the stationary shoes 16, 16 and movable to project from and retract into contact surfaces 16A, 16A of the respective stationary shoes 16, 16.

The guide housing 15 has a recessed portion 15A provided between the stationary shoes 16, 16 on each side and opening toward the transmission chain 14 for movably receiving therein the movable shoe 17, and a plunger hole 15B aligned with the central axis of the tensioner guide 11 (which is perpendicular to the straight centerline L) and extending through the guide housing 15. The plunger hole 15B has opposite ends each opening at the center of each of the recessed portions 15A, 15A.

Each movable shoe 17 has a contact surface 17A provided for sliding contact with the transmission chain 4, and a plunger retaining recess or hole 17B formed in an inside surface opposite from the contact surface 17A. The plunger retaining hole 17B and the plunger hole 15B are aligned with each other.

A pair of cup-shaped plungers 18, 18 is slidably received in the plunger hole 15B with open ends of the respective plungers 18, 18 being faced with each other. A closed end of each of the cup-shaped plungers 18, 18 is firmly fitted in the plunger retaining hole 17B of a corresponding one of the movable shoes 17. The cup-shaped plungers 18, 18 have respective cylindrical hollow portions 18A, 18A communicating with the plunger hole 15B at the open ends of the plunger 18, 18. The hollow portions 18A, 18A and the plunger hole 15B jointly form a high-pressure chamber H.

A compression coil spring 19 serving as an urging means is disposed in the high-pressure chamber H and acts between the two plungers 18, 18 to resiliently urge them in opposite directions away from each other so that diametrically opposite portions of the inside peripheral surface of the transmission chain 14 are forced outwardly away from each other by the contact surfaces 17A, 17A of the movable shoes 17, 17.

Figure 3:
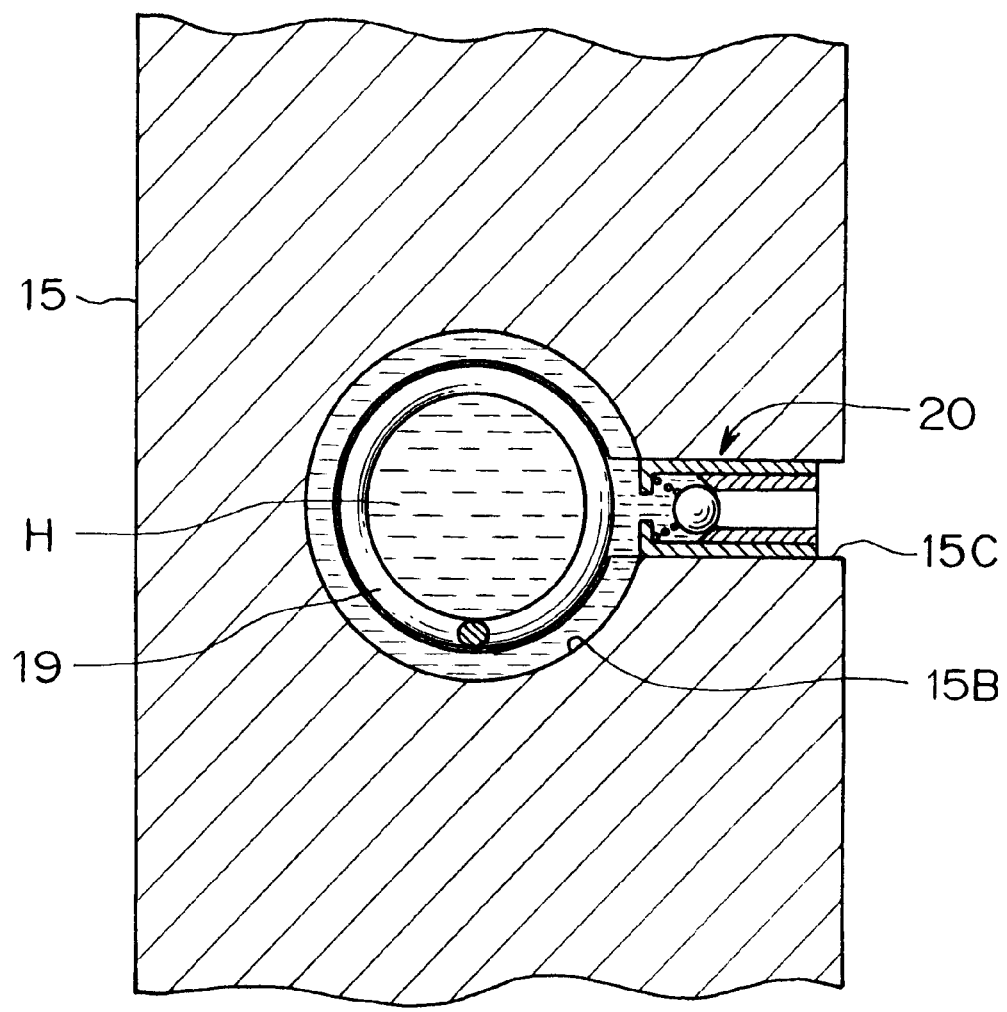
FIG. 3 is a cross-sectional view taken along line III—III of FIG. 2.
Figure 4:
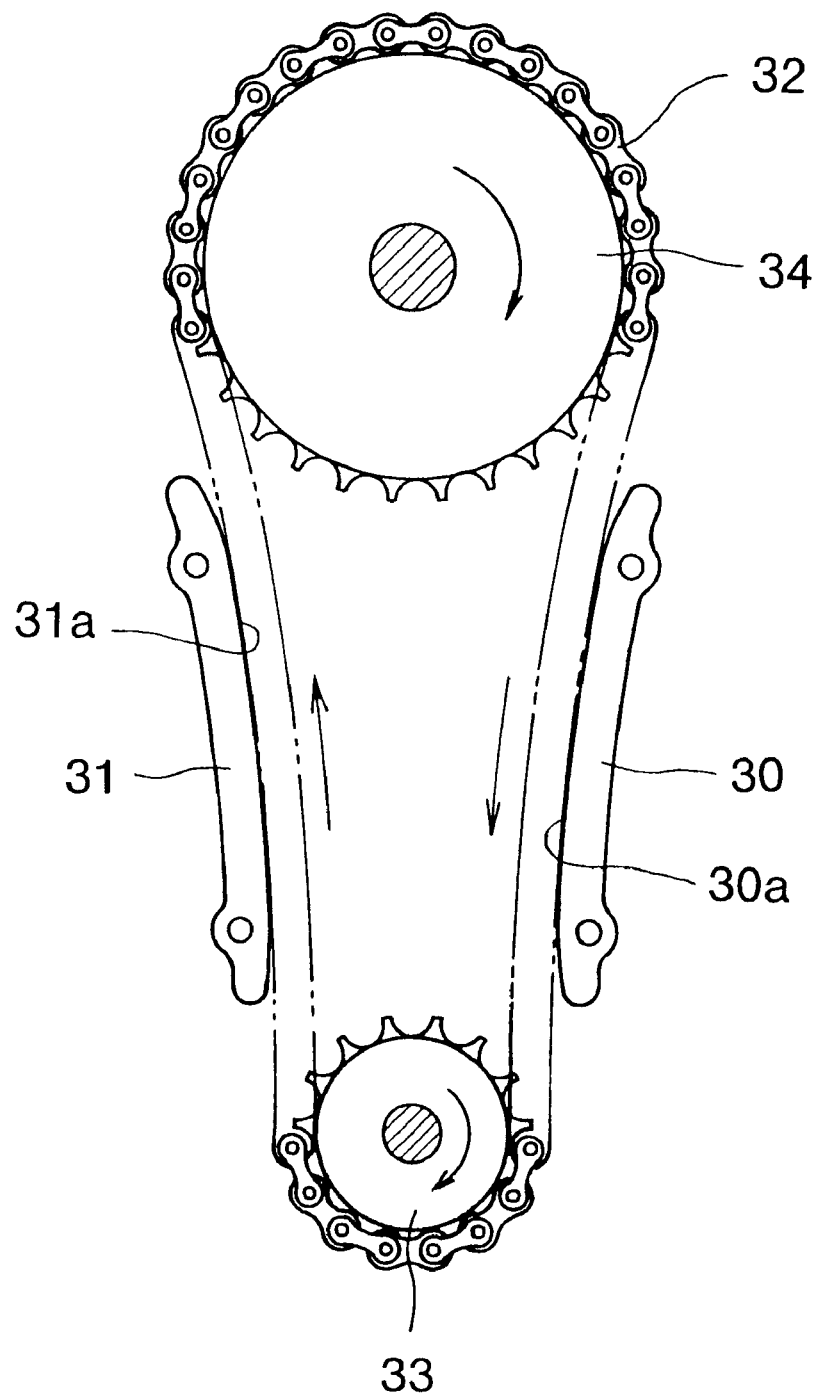
FIG. 4 is a front elevational view showing an example of chain guide mechanism used in a conventional chain drive unit.
Figure 5:
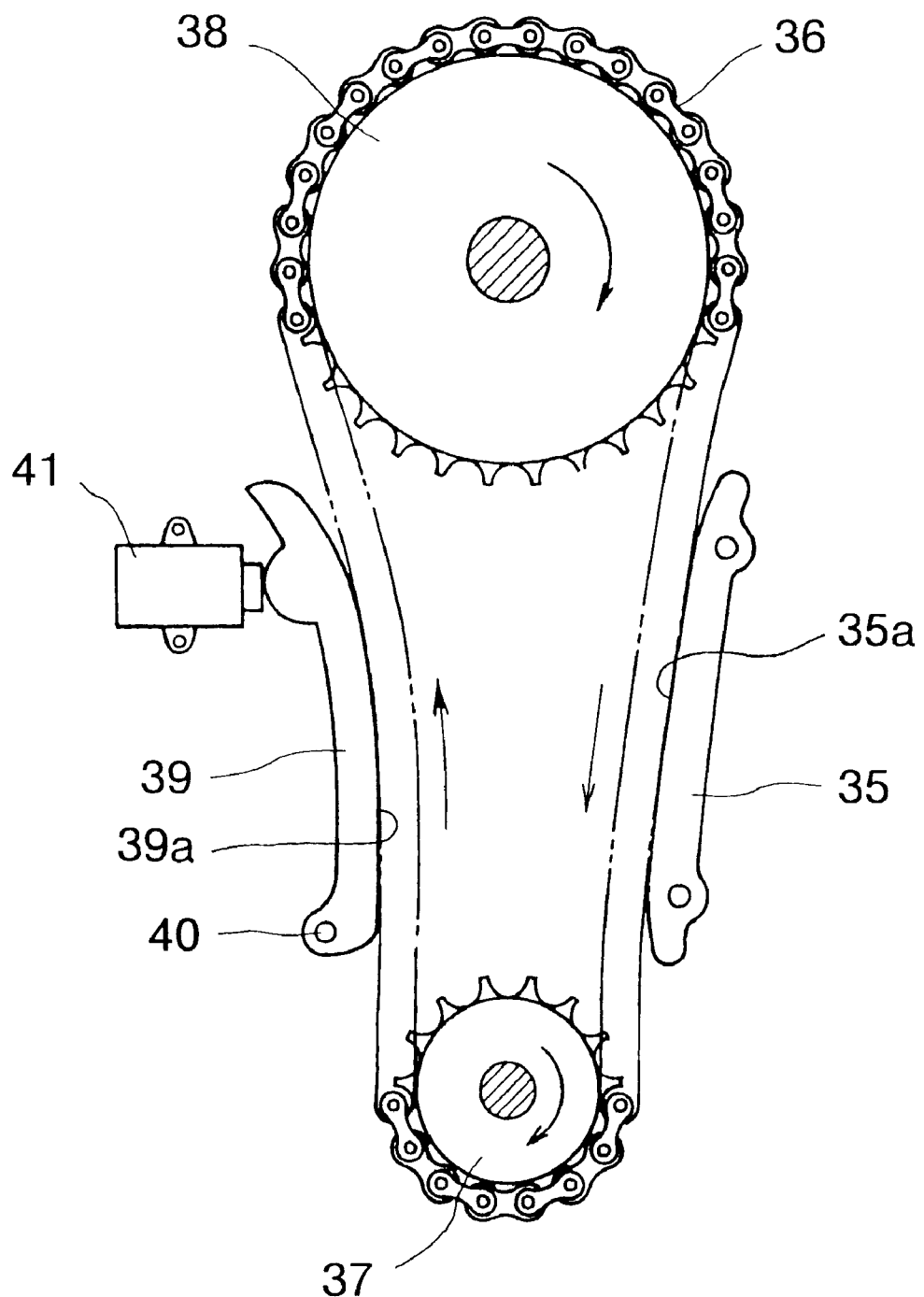
FIG. 5 is a view similar to FIG. 4, but showing another conventional chain guide mechanism.

The guide housing 15 also has an oil inlet 15C connected at one end (inner end) to a central portion of the plunger hole 15B. The other end (outer end) of the oil inlet 15C is connected to an external oil supply source (not shown). As shown in FIG. 3, a ball check valve 20 is assembled in the oil inlet 15C. An oil is supplied from the non-illustrated external oil supply source through the ball check valve 20 into the high-pressure chamber H so that the high-pressure chamber H is always filled with the oil. The ball check valve 20 permits passage therethrough of the oil in one direction from the oil supply source to the high-pressure chamber H and blocks passage of the oil in the opposite direction.

The tensioner guide 11 of the foregoing construction operates as follows.

When the drive sprocket 12 is driven to rotate in the clockwise direction indicated by the arrow shown in FIG. 2, the transmission chain 14 running over and around the drive and driven sprockets 12, 13 provides a tension run on one side (right-hand side in FIG. 2) of the drive sprocket 12 and a slack run on the other side (left-hand side in FIG. 2) of the drive sprocket 12. The tension run of the transmission chain 14 is pulled by the drive sprocket 12 and hence is stretched between the drive and driven sprockets 12, 13. The thus stretched tension run urges the contact surface 17A of the associated movable shoe 17 (on the right-hand side in FIG. 2) leftward in FIG. 2 with the result that the right-hand side plunger 18 is retracted into the plunger hole 15B.

As a consequence of this movement of the plunger 18, the pressure of oil trapped inside the high-pressure chamber H and the force of the compression coil spring 19 act in a direction to move the other plunger 18 (on the left-hand side in FIG. 2) out from the plunger hole 15B. The slack run of the transmission chain 14 is, therefore, urged by the contact surface 17A of the left-hand side movable shoe 17 in a direction (leftward in FIG. 2) away from the tension run. Thus, the transmission chain slack run is held under tension by the left-hand side movable shoe 17.

In this instance, a reaction force acting from the transmission chain 14 onto the movable shoe 17 on the slack run side is transmitted via the same movable shoe 17 to the plunger 18 and thus increases the pressure of oil held in the high-pressure chamber H.

A pressure rise developed inside the high-pressure chamber H forces the oil to leak from the high-pressure chamber H to the outside of the tensioner guide 11 through a small clearance between respective outside peripheral surfaces of the plungers 18, 18 and an inside peripheral surface of the plunger hole 15B, as a consequence of which the plungers 18, 18 approach each other until when the force of the compression coil spring 19 is in balance with reaction forces acting from the tension run and slack run of the transmission chain 14 onto the plungers 18, 18.

As the reaction forces decreases, the spacing between the plungers 18, 18 is enlarged by the force of the compression coil spring 19 during which time the oil is automatically replenished from the external oil supply source through the ball check valve 20 into the high-pressure chamber H.

When the tension in the tension run of the transmission chain 14, tending to retract the movable shoe 17 into the recessed portion 15A of the guide housing 15, exceeds a predetermined value, the transmission chain tension run comes into contact with the contact surfaces 16A, 16A of the stationary shoes 16, 16. The transmission chain tension run is, therefore, supported by the contact surfaces 16A, 16A of the stationary shoes 16, 16 and the contact surface 17A of the movable shoe 17.

On the other hand, because the tension acting on the slack side of the transmission chain 14 is small, the movable shoe 18 urged against the transmission chain slack run by the force of the compression coil spring 19 projects from the contact surfaces 16A, 16A of the stationary shoes 16, 16 and can be freely displaced into and out from the recessed portion 15A. In this condition, if the movable shoe 17 is subjected to an impact force caused by a sudden change of the tension on the transmission chain slack side, the impact force is immediately transmitted via the oil in the high-pressure chamber H to the plunger 18 on the tension run side and thence retained by the tension run of the transmission chain 14 via the movable shoe 17 associated therewith. At the same time, the pressure of oil inside the high-pressure chamber H increases with the result that the oil is force to leak from the high-pressure chamber H to the outside of the tensioner guide 11 through the clearance between the outside peripheral surfaces of the plungers 18, 18 and the inside peripheral surface of the plunger hole 15B. In this instance, the oil is subjected to a flow resistance by means of which the impact force is substantially taken up or absorbed.

When the drive sprocket 12 is rotated in a direction opposite to the direction of the arrow in FIG. 2 (namely, in the counterclockwise direction), the positional relationship between the tension run and the slack run of the transmission chain 14 is reversed. In this instance, because the tensioner guide 11 is symmetric in construction with respect to the straight centerline L interconnecting the axes O, O' of rotation of the drive and driven sprockets 12, 13, the movable shoe 17 on the tension run side (on the left-hand side in FIG. 2) is retracted into the recessed portion 15A of the guide housing 15 by means of a transmission chain tension run which is stretched between the drive and driven sprockets 12, 13. Conversely, the movable shoe 17 on the slack run side (on the right-hand side in FIG. 2) projects from the contact surfaces 16A, 16A of the stationary shoes 16, 16 under the force of the compression coil spring 19 and the pressure of oil inside the high-pressure chamber H. The transmission chain slack run is urged outwardly away from the transmission chain tension run. Thus, the transmission chain 14 while running over and around the drive and driven sprockets 12, 13 can be stably held under proper tension by means of the tensioner guide 11.

In the embodiments described above, the high-pressure chamber is held in fluid communication with the external oil supply source via the ball check valve. The ball check valve may be replaced by a different type of check valve. In the case where fluctuations of chain tension are small, the check valve may be omitted, in which instance the loads or forces exerted on the movable shoes are born by an urging means such as a compression coil spring or a conical spring washer.

Although in the embodiments described above the positional relationship between the tension run and the slack run of a transmission chain are reversed by reversing the direction of rotation of the drive sprocket, such change in the positional relationship may alternatively be achieved by changing over the drive side and drive side of the two sprockets.

It appears clear from the foregoing description that the tensioner guide according to the first embodiment of the present invention can accommodate variations of the chain tension occurring when a tension run and a slack run of the transmission chain are reversed, when the direction of rotation of a drive sprocket is reversed or when the drive side and the driven side of the two sprockets are switched over. The tension guide thus insures smooth and reliable power transmission by the chain drive unit.

Even when the transmission chain undergoes elongation resulting from a long period of use, the movable shoe projects from the contact surfaces of stationary shoes to take out slack in the transmission chain. The transmission chain can run over and around the sprockets smoothly without generating undue vibration and operation noises.

When the tension in the transmission chain increases, the movable shoe retracts into the contact surfaces of the stationary shoes and the transmission chain is supported on the respective contact surfaces of the stationary and movable shoes. In this instance, because a large contact area is provided between the transmission chain and the stationary and movable shoes, the contact pressure between the transmission chain and the contact surfaces of the shoes is greatly reduced. As a result, the shoes has a long service life and hence increases the durability of the tensioner guide.

The tensioner guide according to the second embodiment is advantageous over the tensioner guide of the first embodiment in that since the guide housing, urging member, high-pressure chamber and check valve are used in common to the movable shoe and plunger on the tension run side and the movable shoe and plunger on the slack run side, it becomes possible to reduce the overall weight, the number of parts used and the production cost of the tensioner guide.

Additionally, because the movable shoe on the tension run side and the movable shoe on the slack run side are operationally interlocked via the urging member and the oil inside the high-pressure chamber, an impact force acting on the transmission chain can effectively be dampened and an optimum tension balance is provided between the tension run side and the slack run side of the transmission chain.

Obviously, various changes and modifications of the invention are possible in the light of the above teaching. It is to be understood that within the scope of the appended claims the present invention may be practiced otherwise than as specifically described.

What is claimed is:

1. A tensioner guide for use in a chain drive unit including an endless transmission chain trained over a pair of sprockets, and having free spans between the sprockets, said tensioner guide comprising:
   a stationary shoe having a stationary contact surface confronting one of the free span of the transmission chain between the sprockets;
   a movable shoe adjacent said stationary shoe and movable relatively to said stationary shoe in a direction toward and away from said one of the free spans of the transmission chain; and
   an urging member for urging said movable shoe toward said one of the transmission chain free spans,
   wherein said movable shoe has a movable contact surface adjacent said stationary contact surface and being pressed against and in sliding contact with said one free span by the action of said urging member to hold a tension in the transmission chain, and
   wherein said movable contact surface is movable in response to a decrease in the tension in the transmission chain, to project away from said contact surface of said stationary shoe to take out slack in the transmission chain and, in response to an increase in the tension in the transmission chain, to retract into alignment with said contact surface of said stationary shoe to such an extent that said contact surface of said stationary shoe and said contact surface of said movable shoe are in sliding contact with said one free span.

2. A tensioner guide according to claim 1, wherein said stationary shoe has first and second shoe portions spaced in a direction of movement of the transmission chain, and said movable shoe is disposed between said first and second shoe portions of said stationary shoe.

3. A tensioner guide according to claim 1, wherein said urging member is a compression coil spring.

4. A tensioner guide according to claim 1 wherein the sprockets have axes of rotation spaced apart along a line extending between the sprockets, further including a guide housing disposed adjacent to the free span of the transmission chain and having a plunger hole extending perpendicularly to the line extending between the axes of rotation of the sprockets, and a plunger slidably received in said plunger hole, wherein said stationary shoe is attached to said guide housing, said movable shoe is firmly connected to one end of said plunger, and said urging member is disposed in said plunger hole and acts between the opposite end of said plunger and said guide housing.

5. A tensioner guide according to claim 4, wherein said plunger is generally cup-shaped and has an internal hollow portion, said guide housing further has a high-pressure chamber defined jointly by said hollow portion of said plunger and said plunger hole for receiving therein an oil, and a check valve for allowing passage therethrough of the oil in one direction from an external oil supply source to said high-pressure chamber while blocking passage of the oil in the opposite direction, and wherein a pressure rise developed in said high-pressure chamber due to movement of said plunger urges the oil to leak from said high-pressure chamber to the outside of said guide housing through a clearance defined between an outside peripheral surface of said plunger and an inside peripheral surface of said plunger hole.

6. A tensioner guide according to claim 1, wherein one of the sprockets is a drive sprocket and the transmission chain has a tension run on one side of the drive unit and a slack run on the other side of the drive unit, and including a second stationary shoe, and a second movable shoe, said second shoes having contact surfaces disposed adjacent the other of the tension run and the slack run of the transmission chain.

7. A tensioner guide for use in a chain drive unit including an endless transmission chain trained over a drive sprocket and a driven sprocket to provide a tension run on one side of the drive unit and a slack run on the opposite side of the drive unit, said sprockets having axes of rotation spaced apart along a centerline extending between the sprockets, said tensioner guide comprising:
   a guide housing disposed between the tension run and the slack run of the transmission chain and having a plunger hole extending through said guide housing in a direction perpendicular to a line extending between the axes of rotation of said drive and driven sprockets, said housing having an inside peripheral surface;

a pair of stationary shoes attached to opposite surfaces of said guide housing and having stationary contact surfaces respectively confronting the tension run and the slack run of the transmission chain;

a pair of generally cup-shaped plungers slidably received in said plunger hole with open and closed ends, the respective open ends confronting each other, said plungers each having an internal hollow portion, and an outside peripheral surface, said hole peripheral surface and said plunger peripheral surfaces defining a clearance between said peripheral surfaces;

an urging member disposed in said plunger hole and acting between said plungers to urge them in a direction away from each other;

a pair of movable shoes firmly connected to the respective closed ends of said cup-shaped plungers and having movable contact surfaces to project from and retract into alignment with said stationary contact surfaces of said stationary shoes by and against the action of said urging member so as to be pressed against and in sliding contact with the tension run and slack run of the transmission chain; and said guide housing further having a high-pressure chamber defined jointly by said plunger hole and said hollow portions of said plungers for receiving therein an oil, an oil inlet opening to a central portion of said plunger hole for introducing the oil into said high-pressure chamber, and a check valve assembled in said oil inlet for allowing passage therethrough of the oil in one direction from an external oil supply source to said high-pressure chamber while blocking passage of the oil in the opposite direction, wherein a pressure rise developed in said high-pressure chamber due to movement of at least one of said plungers urges the oil to leak from said high-pressure chamber to the outside of said guide housing through said clearance.

8. A tensioner guide according to claim 7, wherein each of said stationary shoes has first and second shoe portions spaced in a direction of movement of the transmission chain, and each of said movable shoes is disposed between said first and second shoe portions of a corresponding one of said stationary shoes.

9. A tensioner guide according to claim 7, wherein said urging member is a compression coil spring.

* * * * *

UNITED STATES PATENT AND TRADEMARK OFFICE
CERTIFICATE OF CORRECTION

PATENT NO. : 6,129,644

DATED : October 10, 2000

INVENTOR : Inoue, Kozo

It is certified that errors appear in the above-identified patent and that said Letters Patent is hereby corrected as shown below:

On the front page, insert the following:

--[30] Foreign Application Priority Data
Oct. 14, 1997    [JP]    Japan......................9-280431--.

Signed and Sealed this

Eighth Day of May, 2001

Attest:

NICHOLAS P. GODICI

Attesting Officer

Acting Director of the United States Patent and Trademark Office